United States Patent [19]
Pickard

[11] 3,943,325
[45] Mar. 9, 1976

[54] ENGINE PREHEATER

[75] Inventor: Bernard H. Pickard, Toronto, Canada

[73] Assignee: Bardon Research and Development Limited, Toronto, Canada

[22] Filed: Oct. 15, 1974

[21] Appl. No.: 514,661

Related U.S. Application Data

[63] Continuation-in-part of Ser. No. 321,455, Jan. 5, 1973, which is a continuation-in-part of Ser. No. 159,816, July 6, 1971, abandoned.

[52] U.S. Cl............ 219/208; 123/142.5 E; 219/301; 339/44 R
[51] Int. Cl.$^2$... F02N 17/04; F24H 1/10; H05B 1/02
[58] Field of Search................ 219/208, 301, 540; 123/142.5 E; 339/44 R, 44 M

[56] References Cited
UNITED STATES PATENTS

3,482,205  12/1969  Senior............................ 339/44 R X

FOREIGN PATENTS OR APPLICATIONS

| 850,765 | 9/1970 | Canada | 219/208 |
| 745,341 | 2/1933 | France | 219/208 |

Primary Examiner—Albert W. Davis, Jr.
Attorney, Agent, or Firm—Sim & McBurney

[57] ABSTRACT

An engine preheater of the lower radiator hose type includes a housing that is adapted to be connected to a radiator hose and which has a passage extending therethrough for passage of coolant through the heater. An electric heating element is housed by the housing and is at least partly embedded therein. It supplies heat to coolant in the passage. A thermostat is located in heat transfer relationship with the housing and is separated from the heating element by a part of the housing which is heat conductive. The thermostat is responsive to the temperature of the heating element for interrupting the supply of power thereto when the temperature sets by the thermostat exceeds a predetermined upper limit. A plug is adapted to be electrically connected to the heating element, and the thermostat is incorporated in this plug. Between the housing and the plug there is provided means that releasably bias the plug towards the housing and hence the thermostat against the housing to assure good thermal contact between the thermostat and the housing.

8 Claims, 7 Drawing Figures

U.S. Patent  March 9, 1976  Sheet 1 of 2  3,943,325
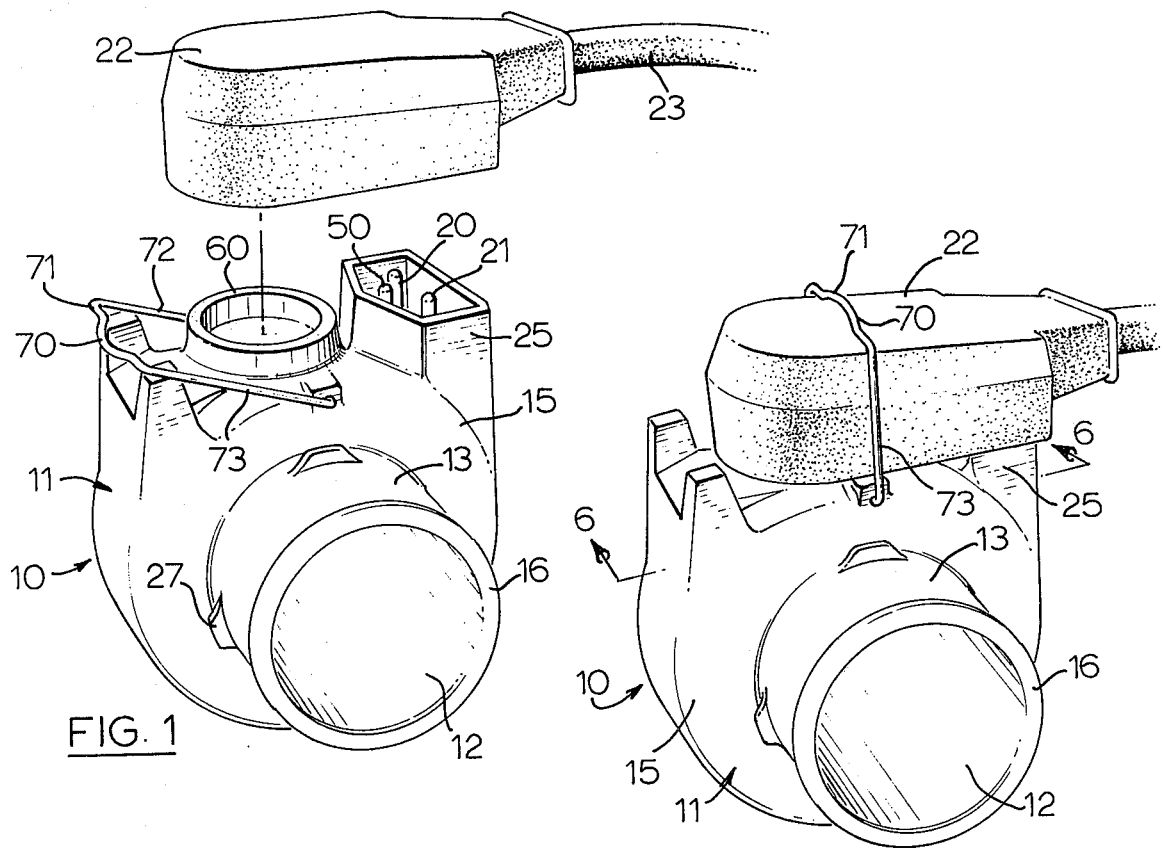
FIG. 1
FIG. 2
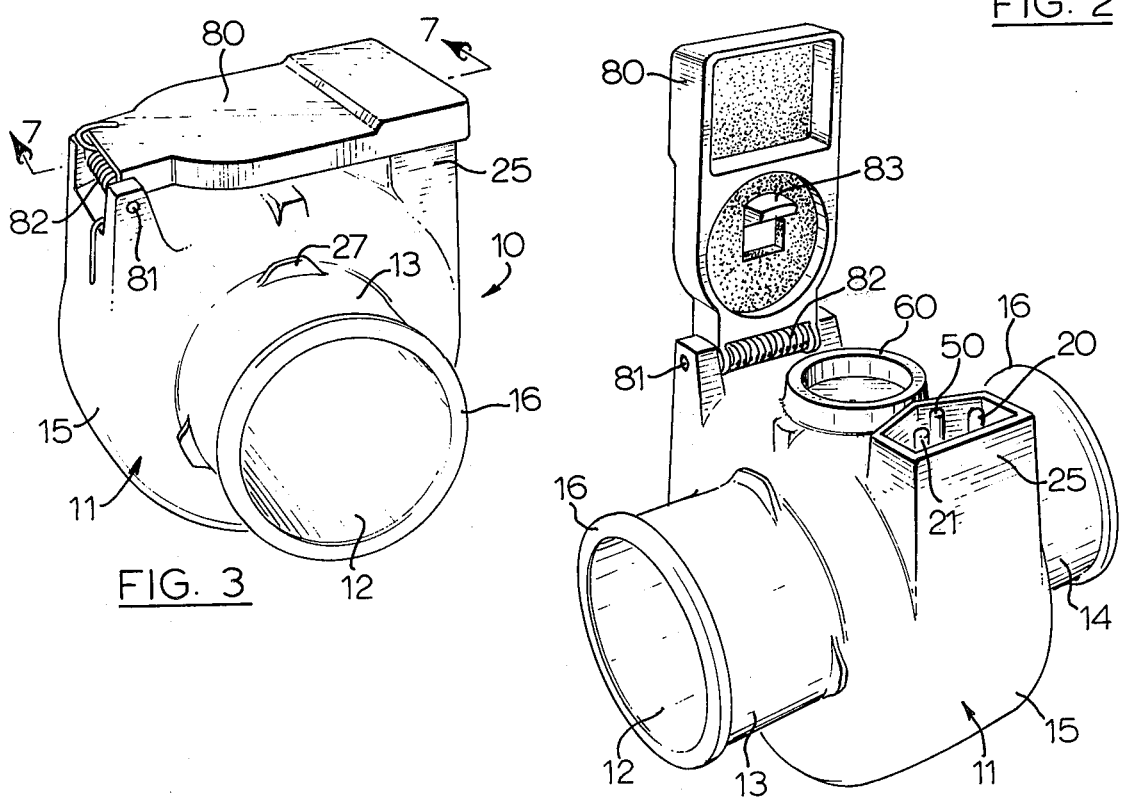
FIG. 3
FIG. 4

ENGINE PREHEATER

CROSS-REFERENCE TO RELATED APPLICATIONS

This is a continuation-in-part of my copending application Ser. No. 321,455, filed Jan. 5, 1973 which, in turn, is a continuation-in-part of my now abandoned application Ser. No. 159,816, filed July 6, 1971.

BACKGROUND OF THE INVENTION

This invention relates to a preheater for an engine, i.e., to a heater for the coolant of a liquid cooled engine. More particularly, this invention relates to an engine preheater of the lower radiator hose type.

For many years internal combustion engines, particularly automobile engines, that are called upon to operate at least part of the time in cold weather have been provided with engine preheaters or block heaters of the frost plug type to facilitate starting of the engines. This type of block heater is essentially an immersion heater that is located in a frost plug opening in the block of an engine. The basic problem with frost plug type block heaters is that an extremely wide variety of them now must be manufactured and stocked if one is to be able to provide a block heater for every different automobile on the road. Thus, from 1963 to 1971 the number of different types of block heaters that would have to be provided just for the most popular makes of automobiles on the road has increased from 16 to 30.

Because of this problem a different type of engine preheater known as the lower radiator hose type has been developed. This type of engine preheater, as its name suggests, is connected in the radiator hose, and far fewer heaters of this type are required to be used with different makes of automobiles, since there are only a few standard sizes of radiator hoses.

However, prior art engine preheaters of the lower radiator hose type have in many instances been constructed with the heating element directly in the path of coolant flowing between the radiator and the engine. This can lead to overheating problems, particularly when the engine is operated during the summer months, since it is the practice to leave the engine preheater in the radiator hose at all times. In some designs this problem has been avoided by providing an enlarged peripheral well in the housing of the engine preheater and mounting the heating element in this well so as not to impede the flow of coolant through the device. However, this can lead to the problem of vapour lock. Furthermore, in engine preheaters of this type it has been common to fabricate the heating element itself of copper and the housing of the engine preheater of steel. This has led to problems of galvanic corrosion. There also is the problem of having to solder or braze the element in position.

In aforementioned application Ser. No. 321,455 there is disclosed an engine preheater that avoids the foregoing problems of it predecessors. This heater has a housing with a passage extending therethrough for passage of coolant through the heater. The housing has two end sections and an intermediate section, at least the latter being cast of heat conductive material and being located between the end section. The end sections are adapted to be connected to a radiator hose. An electric heating element is cast in place in and embedded in the intermediate section and is separated from the aforementioned passage by a part of the housing, whereby coolant flowing through the passage is inhibited from direct contact with the heating element but indirectly is heated thereby.

In a preferred embodiment a thermostat is located in heat transfer relationship with the housing on the side of the heating element remote from the passage. The thermostat is responsive to the temperature of the heating element for interrupting the supply of power thereto when the temperature sensed by the thermostat exceeds a predetermined upper limit. The thermostat is incorporated in a plug that is adapted for electrical connection to the heating element.

Further details of this engine preheater may be ascertained from the aforementioned applications, the disclosures of which are incorporated herein by reference.

After an engine preheater has been installed, the aforementioned plug normally is not removed. Operation of the preheater is obtained by plugging in to a conventional power outlet a plug at the other end of the line cord to the end that carries the plug that is connected to the heating element. Likewise, when the automobile or other device containing the engine having the preheater associated therewith is to be moved, or, in the case of a stationary engine, the preheater is to be disconnected, the former plug is disengaged from the power outlet. Consequently the plug that is connected to the heating element rarely is removed. However, it and the engine preheater are subject to vibration when the engine is operating and, in the case of an automobile or other vehicle, to additional vibration due to road shocks. In time these vibrations may impair the operating efficiency of the engine preheater by degrading the thermal connection between the housing of the engine preheater and the thermostat. It also might be possible for the plug that is connected to the heating element to become disconnected therefrom as a result of these vibrations or to become loose enough that oil, water, dirt or other contaminents that could cause a short circuit can find their way into the terminal box for the terminals of the heating element. The latter problem also is one that exists in the case where the plug that is connected to the heating element is removed for some time.

SUMMARY OF THE INVENTION

In accordance with this invention there is provided a heater for the coolant of a liquid cooled engine, said heater being of a type adapted to be connected in a hose between a liquid cooled engine and a radiator, said heater comprising a housing adapted to be connected to a radiator hose and having a passage extending therethrough for passage of coolant through said heater and an electric heating element housed by and at least partly embedded in said housing having exposed terminals and adapted to supply heat to coolant in the passage extending through said housing; a thermostat located in heat transfer relationship with said housing and separated from said heating element by a part of said housing, said part of said housing being heat conductive, said thermostat being responsive to the temperature of said heating element for interrupting the supply of power thereto when the temperature sensed by said thermostat exceeds a predetermined upper limit; a plug adapted for electrical connection to said heating element via said terminals, said thermostat being incorporated in said plug; and means acting between said housing and said plug releasably biasing said plug towards said housing and also biasing said thermostat against said housing to assure good thermal contact between the thermostat and the housing.

In a preferred embodiment the means acting between the plug and housing are constituted by a spring biased cap having a depending finger that engages the plug and biases it toward the housing, the cap being adapted to cover the terminals when the plug is disconnected therefrom and removed from the housing.

BRIEF DESCRIPTION OF THE DRAWINGS

FIGS. 1 and 2 are perspective views of one embodiment of an engine preheater embodying this invention, FIGS. 3 and 4 are perspective views of a preferred embodiment of the invention.

DETAILED DESCRIPTION OF THE INVENTION INCLUDING THE PREFERRED EMBODIMENT

Figure 5:
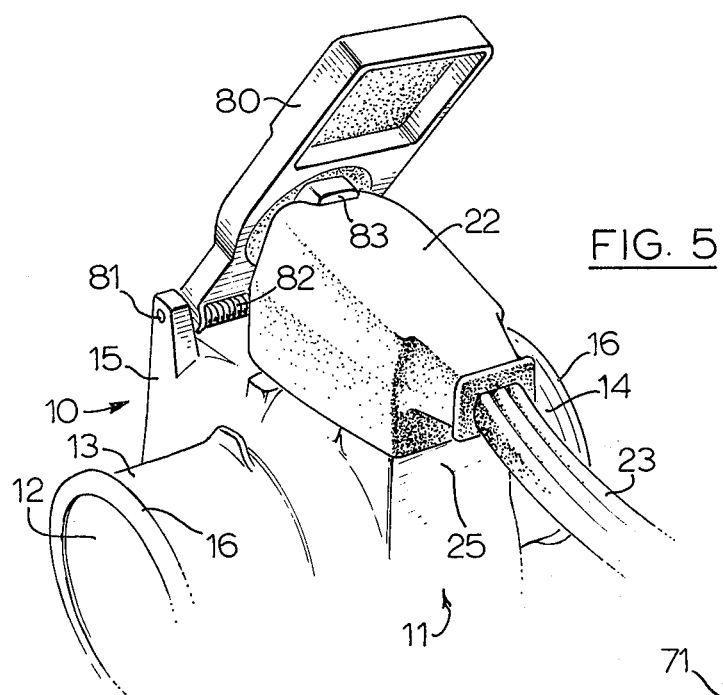
FIG. 5 is a perspective view of a part of the preferred embodiment.

Referring to the drawings, there is shown an engine preheater 10 that includes a housing 11 having a passage 12 extending therethrough for passage of coolant through the heater. Housing 11 has end sections 13 and 14 that are separated from each other by an enlarged intermediate section 15.

End sections 13 and 14 are adapted to be connected to a radiator hose and, to this end, are provided with lips 16 over which the radiator hose must be stretched. Conventional hose clamps may be used for clamping the hose to end sections 13 and 14.

Figure 6:
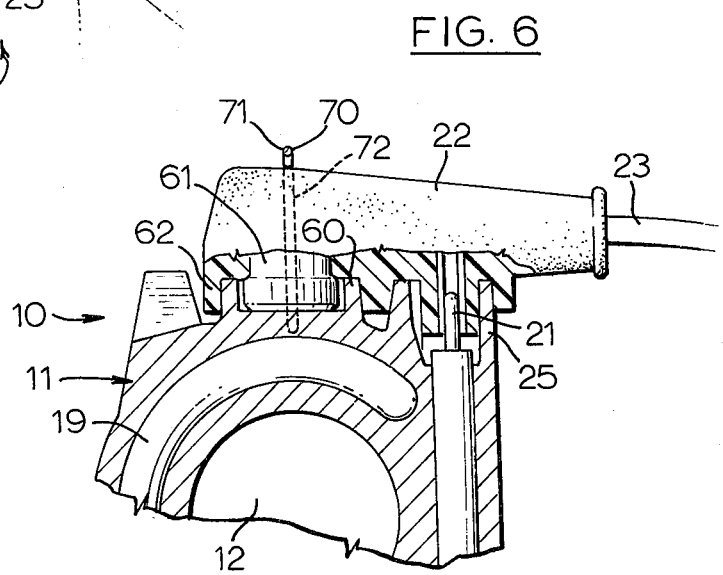
FIGS. 6 and 7 are sectional views taken along lines 6—6 and 7—7 in FIGS. 2 and 3 respectively.
Figure 7:
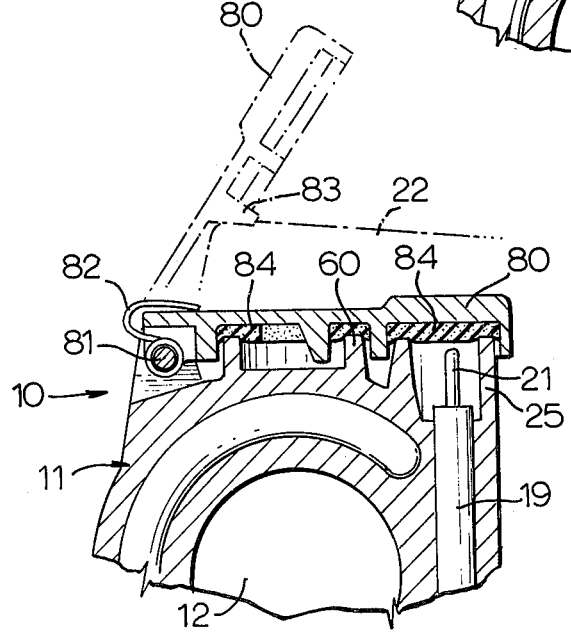

As shown in FIGS. 6 and 7, cast in place in and embedded in intermediate section 15 is a heating element 19 of known conventional type. Housing 11 may be a cast in a permanent mold, and it is to be understood that heating element 19 is positioned in the mold and housing 11 cast around it, whereby element 19 becomes embedded in the casting. In this manner heating element 19 is kept out of contact with coolant flowing through passage 12 to avoid problems of galvanic corrosion.

The casting in place of heating element 19 is not essential to this invention in its broadest aspect, but it is a feature of the preferred embodiment of the invention. In this respect, the casting in place of the heating element in housing 11 avoids any problem of the heating element impeding flow of coolant through passage 12, and tests have shown that ample heat can be indirectly applied from heating element 19 via housing 11 to coolant flowing through passage 12. Heating element 19, as aforementioned, is of a conventional type consisting of an outer steel tube having its outer surface flashed with copper, a resistance wire centrally located in the tube and magnesium oxide surrounding the resistance wire and filling the remainder of the passage through the tube. When this heating element is cast in place, it is believe that adhesion between the metal of the housing and the tube of the heating element takes place. In any event, perfect or almost perfect heat transfer relationship between the housing and the heating element is established, much more so that ever could be established by wrapping a heating element around the housing or inserting it into a preformed cavity in the housing. Furthermore, the additional expense of these manufacturing steps is avoided.

Intermediate section 15 should be fabricated of heat conductive material and, obviously, if the whole of housing 11 is to be cast at one time, the whole of housing 11 will be fabricated of the same heat conductive material. This material preferably is a metal, a very suitable alloy that can be used being "ALCAN" (trade mark) 160X, an aluminum alloy composed of copper-0.1%, iron-0.6%, manganese-0.3%, silicone-10 to 13%, zinc-0.1%, titanium-0.2%, various other elements-0.2%, balance aluminum.

An is shown in FIGS. 1, 4, 6 and 7, heating element 19 has two terminals 20 and 21 that may be connected via a plug 22 and a linecord 23 having a receptacle engaging plug (not shown) at its other end to any suitable source of electrical energy.

Terminals 20 and 21 are located in a receptacle 25 formed integral with and constituting a part of intermediate section 15. Also located in the receptacle and connected thereto is a grounding pin 50.

Since heating element 19 is cast in place in and embedded in intermediate section 15, intermediate section 15 will be hotter than end sections 13 and 14. The end sections are provides with stops 27 that are located adjacent intermediate section 15 but spaced therefrom. The radiator hose abuts against these stops and is prevented thereby from coming into contact with intermediate section 15 so as to reduce deterioration of the hose due to heat.

While it is preferred to cast housing 11 as a unitary structure, it is also possible for housing 11 to consist of a tube having the intermediate section cast or otherwise formed about the central portion of the tube.

The housing may be provides with an integrally formed well 60, while plug 22 has a thermostat 61 (FIG. 6) built into it, this thermostat fitting into well 60, as best shown in FIG. 6, when the plug in connected to the terminals of the heating element. Plug 22 has a skirt portion 62 (FIG. 6) that completely surrounds thermostat 61 and that engages the annular wall that defines well 60 to weather proof the thermostat and seal it in the well.

Heating element 19 is interposed between coolant passage 12 and well 60, so thermostat 61 senses and is responsive to the temperature of element 19, rather than to the temperature of the coolant flowing through passage 12. The thermostat is set and connected to interrupt the supply of power to element 19 when it becomes too hot, as would occur, for example, if there were no coolant present in the preheater, so as to prevent element 19 from burning out. Such an arrangement is not possible in prior art lower radiator hose preheaters of the type where the heating element is in the coolant passage because, when such a preheater runs dry, the heating element is surrounded by air and transmits very little heat to the housing. Consequently in an engine preheater embodying this invention the heating element should be at least partly embedded in housing 11.

Referring now to FIGS. 1, 2 and 6, there is provided a member 70 of generally U-shaped configuration having a cross-piece 71 and two spaced-apart upstanding arms 72 and 73. The upstanding arms are pivotally connected to housing 11 and, as shown in FIGS. 2 and 6, the cross-piece is adapted to engage plug 22 and bias the plug towards housing 11 when U-shaped member 70 is pivoted from the position thereof shown in FIG. 1 where it is out of contact with plug 22 into the position thereof shown in FIGS. 2 and 6 wherein cross-piece 71 overlies plug 22. In this manner good thermal contact is maintained between thermostat 61 and housing 11, and plug 22 is inhibited against becoming loose on housing 11.

In the preferred embodiment of the invention shown in FIGS. 3, 4, 5 and 7 there is provided a cap 80 that is pivotally mounted on housing 11 by means of a pivot pin 81. Surrounding pivot pin 81 is a spring 82 that spring biases cap 80 into engagement with housing 11 so that, when plug 22 is removed, cap 80 seals receptacle 25 and covers terminals 20 and 21, as shown in FIGS. 3 and 7.

Cap 80 has a depending finger 83 that engages plug 22, when the plug is in its connected position, as shown in FIG. 5, and in dotted outline in FIG. 7, whereby plug 22 is biased toward housing 11 to assure good thermal contact between thermostat 61 and housing 11.

If desired, and as shown in FIG. 7, the portions of cap 80 that overlie receptacle 25 and well 60 may be gasketed, as at 84 to ensure good sealing.

While preferred embodiments of this invention have been disclosed herein, those skilled in the art will appreciate the changes and modifications may made therein without departing from the spirit and scope of this invention as defined in the appended claims.

What I claim is:

1. A heater for the coolant of a liquid cooled engine, said heater being of a type adapted to be connected in a hose between a liquid cooled engine and a radiator, said heater comprising a housing having a passage extending therethrough for passage of coolant through said heater, said housing having first and second end sections and an intermediate section, said intermediate section being cast of heat conductive material and being located between said end sections, said end sections being adapted to be connected to a radiator hose, an electric heating element cast in place in and embedded in said intermediate section and separated from the passage through said housing by part of said housing, whereby coolant flowing through the passage in said housing is inhibited from direct contact with said heating element but indirectly is heated thereby, said heating element having exposed terminals, a thermostat located in heat transfer relationship with said housing on the side of said heating element remote from said passage, said thermostat being responsive to the temperature of said heating element for interrupting the supply of power thereto when the temperature sensed by said thermostat exceeds a predetermined upper limit, a plug adapted for electrical connection to said heating element via said terminals, said thermostat being incorporated in said plug, and means acting between said housing and said plug releasably biasing said plug towards said housing and also biasing said thermostat against said housing to assure good thermal contact between said thermostat and said housing.

2. A heater according to claim 1 including a well formed in said intermediate section, said well being located on the side of said heating element remote from the passage through said housing, said thermostat being located in said well.

3. A heater according to claim 1 wherein the last-mentioned means is pivotally mounted on said housing.

4. A heater according to claim 3 wherein said last-mentioned means is a member of generally U-shaped configuration having a cross-piece and two spaced-apart upstanding arms, said upstanding arms being pivotally connected to said housing and said cross-piece being adapted to engage said plug and bias said plug towards said housing when said U-shaped member is pivoted from a first position out of contact with said plug into a second position wherein said cross-piece overlies said plug.

5. A heater according to claim 4 including a well formed in said intermediate section, said well being located on the side of said heating element remote from the passage through said housing, said thermostat being located in said well.

6. A heater according to claim 3 wherein said last-mentioned means includes a spring biased cap having a depending finger that engages said plug and biases said plug toward said housing, said cap being adapted to cover said terminals when said plug is disconnected therefrom and removed from said housing.

7. A heater according to claim 6 including a well formed in said intermediate section, said well being located on the side of said heating element remote from the passage through said housing, said thermostat being located in said well.

8. A heater according to claim 6 wherein said plug has a top surface overlying said thermostat, said finger engaging said top surface.

* * * * *